(12) United States Patent
Kwon

(10) Patent No.: US 9,162,620 B2
(45) Date of Patent: Oct. 20, 2015

(54) METHOD AND APPARATUS OF DETERMINING POSITION OF OBSTACLE, AND PARKING ASSIST METHOD AND SYSTEM

(71) Applicant: MANDO CORPORATION, Pyeongtaek-si, Gyeonggi-do (KR)

(72) Inventor: Young Ju Kwon, Seongnam-si (KR)

(73) Assignee: MANDO CORPORATION, Pyeongtaek-Si, Gyeonggi-Do (KR)

(*) Notice: Subject to any disclaimer, the term of this patent is extended or adjusted under 35 U.S.C. 154(b) by 0 days.

(21) Appl. No.: 14/308,299

(22) Filed: Jun. 18, 2014

(65) Prior Publication Data

US 2015/0097704 A1    Apr. 9, 2015

(30) Foreign Application Priority Data

Oct. 8, 2013    (KR) .................... 10-2013-0119674

(51) Int. Cl.
*B60Q 1/48* (2006.01)
*B60Q 9/00* (2006.01)
*G01S 7/48* (2006.01)
*G01S 17/08* (2006.01)
*G01S 15/93* (2006.01)
*G01S 15/87* (2006.01)

(52) U.S. Cl.
CPC ................ *B60Q 9/006* (2013.01); *B60Q 9/007* (2013.01); *G01S 7/4808* (2013.01); *G01S 15/878* (2013.01); *G01S 15/931* (2013.01); *G01S 17/08* (2013.01); *G01S 2015/932* (2013.01)

(58) Field of Classification Search
CPC ........ B60Q 9/006; B60Q 9/007; G01S 5/878; G01S 15/931; G01S 7/4808; G01S 17/08; G01S 2015/932
USPC ........... 340/932.2, 903, 933, 435, 436, 425.5, 340/438, 437; 701/1, 117, 300, 301; 180/167, 199; 348/148
See application file for complete search history.

(56) References Cited

U.S. PATENT DOCUMENTS

| | | | |
|---|---|---|---|
| 4,931,930 A * | 6/1990 | Shyu et al. | 701/36 |
| 6,326,887 B1 * | 12/2001 | Winner et al. | 340/435 |
| 7,248,153 B2 * | 7/2007 | Danz et al. | 340/435 |
| 7,728,719 B2 * | 6/2010 | Li | 340/435 |

* cited by examiner

*Primary Examiner* — Anh V La
(74) *Attorney, Agent, or Firm* — McDermott Will & Emery LLP

(57) ABSTRACT

The present invention relates to a method of determining a position of an obstacle, an apparatus of determining a position of an obstacle, a parking assist method, and a parking assist system, and more particularly, to a technology of determining a position of an obstacle by comparing propagation distances a direct signal and an indirect signal.

15 Claims, 12 Drawing Sheets

METHOD AND APPARATUS OF DETERMINING POSITION OF OBSTACLE, AND PARKING ASSIST METHOD AND SYSTEM

CROSS-REFERENCE TO RELATED APPLICATION

This application claims priority from and the benefit under 35 U.S.C. §119(a) of Korean Patent Application No. 10-2013-0119674, filed on Oct. 8, 2013, which is hereby incorporated by reference for all purposes as if fully set forth herein.

BACKGROUND OF THE INVENTION

1. Field of the Invention

The present invention relates to a method of determining a position of an obstacle (hereinafter, referred to as an "obstacle position determining method"), an apparatus of determining a position of an obstacle (hereinafter, referred to as an "obstacle postion determining apparatus"), a parking assist method, and a parking assist system.

2. Description of the Prior Art

In general, a blind spot which cannot be confirmed with a mirror or eyes generally exists when parking a vehicle, and it is highly concerned that the vehicle suffers from a contact accident due to an object which is present in the blind spot.

In order to alleviate such a problem, a conventional parking assist system determines a position of an obstacle and informs a driver of the position of the obstacle in which a plurality of ultrasonic wave sensors are used in such a manner that signals sent from the ultrasonic wave sensors are reflected from the obstacle and the reflected signals are received by the ultrasonic wave sensors so as to determine the position of the obstacle.

However, there is a limit in the conventional parking assist system, a conventional obstacle position determination apparatus, or the like in that when an obstacle is present in an area where signal sending regions of the plurality of sensors overlap, all the reflected signals from respective sensors are received which makes it difficult to determine a sensor, of which the front region is positioned more closely to the obstacle. Due to this limit, the driver may merely obtain information in an alarm level which indicates that an obstacle is present without recognizing the correct position of the obstacle. Thus, the driver cannot obtain correct information as to which direction the vehicle should be driven to in order to avoid the obstacle.

SUMMARY OF THE INVENTION

In this background, an object of the present invention is to provide an obstacle position determining apparatus and a parking assist system in which, when an obstacle is positioned in an area where regions of sending signals emanating from a plurality of sensors overlap, it is possible to more correctly determine which sensor is positioned more closely to the area where an obstacle is positioned.

In order to achieve the above-described objects, according to an aspect of the present invention, there is provided an obstacle position determination apparatus including: at least two sensors configured to transmit signals at different positions and receive reflected signals when the transmitting signals are reflected from an obstacle; an propagation distance calculation unit configured to calculate an propagation distance of a direct signal which is sent from a first sensor which is one of the at least two sensors and received by the first sensor, and an propagation distance of an indirect signal which is sent from a second sensor which is different from the first sensor among the two more sensors and received by the first sensor; and position determining unit configured to determine a position of the obstacle by comparing the propagation distance of the direct signal and the propagation distance of the indirect signal based on a result calculated by the propagation distance calculation unit.

According to another aspect of the present invention, there is provided a parking assist system including: at least two sensors configured to transmit signals at different positions and to receive reflected signals when the transmitting signals are reflected from an obstacle; an obstacle position determining unit configured to determine the position of the obstacle by comparing an propagation distance of a direct signal which is sent from a first sensor which is one of the at least two sensors and received by the first sensor and an propagation signal of an indirect signal which is sent from a second sensor which is different from the first sensor among the at least two sensors and received by the first sensor; and an obstacle position display unit configured to divide a region where the at least two sensors send signals into at least two areas and to display an alarm indicating that the obstacle exists in an area including the obstacle position determined by the obstacle position determining unit among the at least two areas.

According to still another aspect of the present invention, there is provided an obstacle position determining method including: sending signals at different positions by at least two sensors and when the signals are reflected from an obstacle, receiving reflected signals by the at least two sensors; calculating an propagation distance of a direct signal which is sent from a first sensor which is one of the at least two sensors and received by the first sensor, and an propagation distance of an indirect signal which is sent from a second sensor which is different from the first sensor among the at least two sensors and received by the first sensor; and based on results calculated in the calculating of the propagation distances, determining the position of the obstacle by comparing the propagation distance of the direct signal and the propagation distance of the indirect signal.

According to yet another aspect of the present invention, there is provided a parking assist method including: sending signals at different positions by at least two sensors and, when the signals are reflected by an obstacle, receiving reflected signals by the at least two sensors; determining a position of the obstacle by comparing an propagation distance of a direct signal which is sent by a first sensor which is one of the at least two sensors and received by the first sensor, and an propagation distance of an indirect signal which is sent by a second sensor which is different from the first sensor among the at least two sensors and received by the first sensor; and dividing a region where the at least two sensors send the signals into two or more areas to determine the position of the obstacle, and displaying an alarm indicating that the obstacle exists in an area including the position of the obstacle which is determined in the determining of the position of the obstacle among the at least two areas.

As described above, according to the present invention, more correct information for a position of an obstacle may be provided through a difference between propagation distances of a direct signal and an indirect signal received by sensors of which the positions are different from each other.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

Hereinafter, some exemplary embodiments of the present invention will be described in detail with reference to illustrative drawings. In the description of the elements of the present invention, terms "first", "second", "A", "B", "(a)", "(b)" and the like may be used. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

Figure 1:
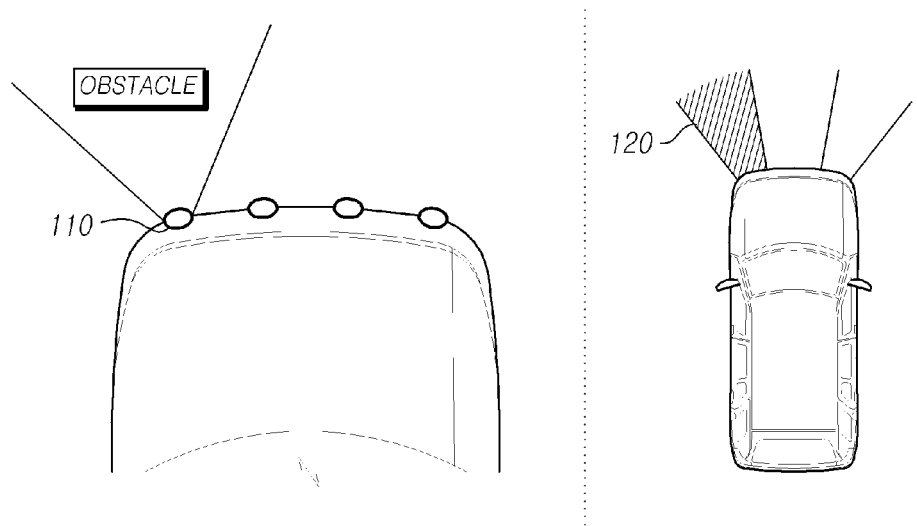
FIG. 1 is a view illustrating a method of determining an obstacle position of a parking assist system according to a prior art.

FIG. 1 is a view illustrating a method of determining an obstacle position (hereinafter, referred to as an "obstacle position determination position") of a parking assist system according to a prior art.

Referring to FIG. 1, a conventional parking assist system sends signals through a plurality of sensors and receives reflected signals through the plurality of sensors so as to determine a position of an obstacle. When a sensor 110 receives a reflected signal, the system determines that an obstacle is positioned in front of the sensor 110 which sent the reflected signal, and as illustrated in a right figure of FIG. 1, provides an alarm indication that the obstacle exists in the front region 120 of the sensor 110 so as to warn a driver of the obstacle.

However, such a conventional parking assist system has a problem in terms of accuracy when an obstacle exists in an area where the signal sending regions of respective sensors overlaps.

Figure 2:
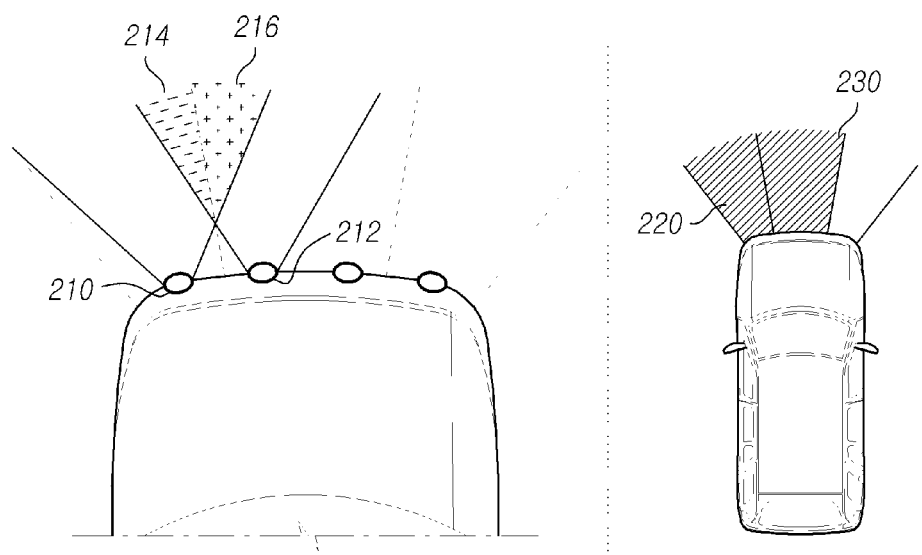
FIG. 2 is a view illustrating a problem of a conventional parking assist system illustrated in FIG. 1.

FIG. 2 is a view illustrating a problem of a conventional parking assist system illustrated in FIG. 1.

Referring to FIG. 2, the conventional parking assist system lacks accuracy in determining a position of an obstacle in areas 214 and 216 where the signal sending regions of two sensors 210 and 212 overlap.

For example, assuming that an obstacle exists in the areas 214 and 216 where the signal sending regions of the above-mentioned two sensors 210 and 212 overlap, in an ideal case, it is reasonable that when the obstacle exists in the area 214 adjacent to the left sensor 210, an alarm is turned on in the area 214 including the front side of the left sensor 210 and when the obstacle exists in the area 216 adjacent to the right sensor 212, an alarm is turned on in the area 216 including the front side of the right sensor 212.

However, in the areas 214 and 216 where the signal sending regions of the above-mentioned two sensors 210 and 212 overlap, the reflected signals of the signals sent from the two sensors 210 and 212 may be received by both of the sensors 210 and 212. Thus, it is difficult to determine the correct position of the obstacle. Accordingly, the conventional system has a problem in that alarms are indicated in both of the front regions 220 and 230 of the two sensors 210 and 212 and thus, the driver cannot determine the correct position of the obstacle.

Thus, the present invention provides an apparatus of determining an obstacle position (hereinafter, referred to as an "obstacle position determination apparatus") and a parking assist system which may determine a position of an obstacle more correctly when signals sent from a plurality of sensors are reflected by the obstacle and received by one sensor and an operating method thereof.

Figure 3:
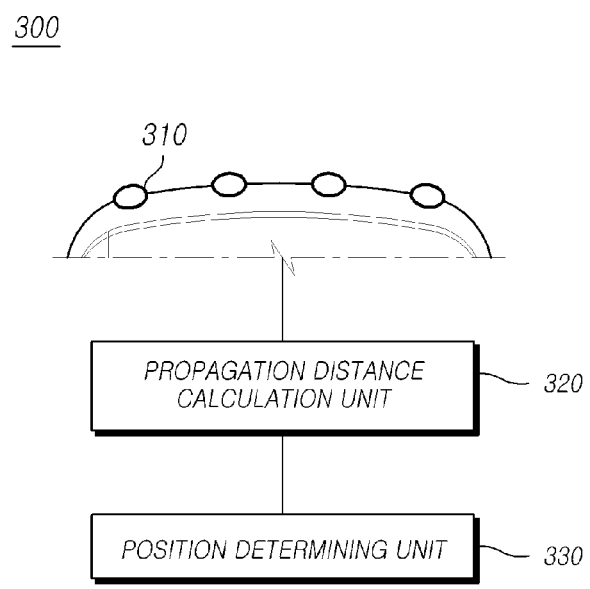
FIG. 3 is a block diagram of an apparatus of determining an obstacle position determination apparatus according to an exemplary embodiment of the present invention.

FIG. 3 is a block diagram of an apparatus of determining an obstacle position determination apparatus 300 according to an exemplary embodiment of the present invention.

Referring to FIG. 3, an obstacle position determination apparatus 300 according to an exemplary embodiment of the present invention may include: at least two sensors 310 configured to transmit or send signals at different positions and receive reflected signals when the transmitting signals are reflected from an obstacle; an propagation distance calculation unit 320 configured to calculate an propagation distance of a direct signal which is sent from a first sensor which is one of the at least two sensors 310 and received by the first sensor and an propagation distance of an indirect signal which is sent from a second sensor which is different from the first sensor among the two more sensors 310, and received by the first sensor; and position determining unit 330 configured to compare the propagation distance of the direct signal and the propagation distance of the indirect signal based on a calculated result to determine a position of the obstacle.

The at least two sensors 310 send signals, respectively, and when the signals are reflected by an obstacle, the at least two sensors 310 receive the reflected signals.

When the signals are sent from the sensors and then the reflected signals are received, the position of the obstacle is determined based on which sensors are the sensors that sent the signals and the sensors that received the sensors.

Accordingly, in order to make a sensor that sends a reflected signal and a sensor that receives the signal vary depending on the position of the obstacle, the at least two sensors 310 may send signals at different positions only in a range of a predetermined solid angle with an intensity equal to or higher than a predetermined level.

The above-mentioned, "intensity equal to or higher than a predetermined level" technically refers to an intensity equal to or higher than an intensity that allows a sent and reflected signal to be received and observed.

The signals sent by the at least two sensors 310 are not limited as long as they are capable of being propagated and reflected.

For example, the signals sent from the at least two sensors 310 may be composed of ultrasonic wave signals and/or electromagnetic signals. However, when the electromagnetic signals are used, it is necessary to consider wave absorption by the obstacle, interference with other noise such as sunlight, etc. Thus, the ultrasonic wave signals are advantageous for signal generation and measurement but the present invention is not limited thereto.

As described above, when signals are received by the first sensor which is one of the at least two sensors, an propagation distance calculation unit 320 discriminates the signals into a direct signal sent from the first sensor and an indirect signal sent from the second sensor which is different from the first sensor and calculates the propagation distances of the direct signal and the indirect signal.

Figure 4:
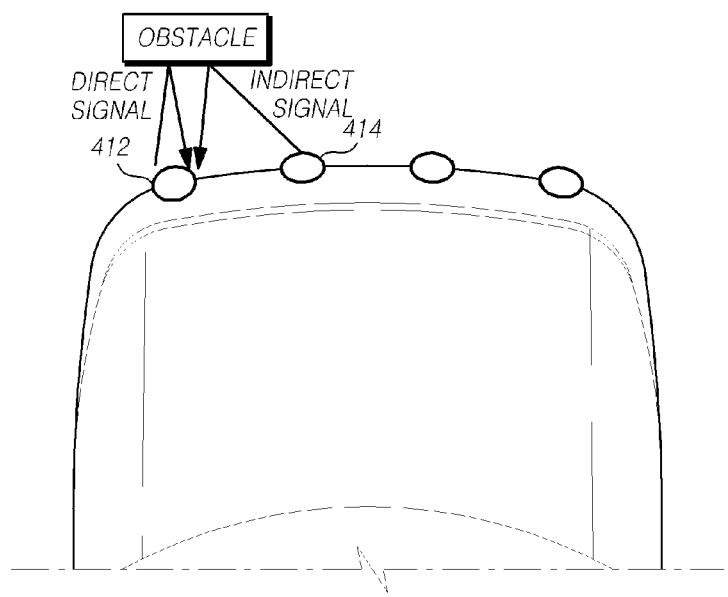
FIG. 4 is a view illustrating an example in which a first sensor receives a direct signal and an indirect signal in the obstacle position determination apparatus according to the exemplary embodiment of the present invention.

FIG. 4 is a view illustrating an example in which a first sensor 412 receives a direct signal and an indirect signal in the obstacle position determination apparatus according to the exemplary embodiment of the present invention.

Referring to FIG. 4, the signals which may be received by the first sensor 412 which is one of the plurality of sensors may be discriminated into a direct signal sent from the first sensor 412 and reflected by an obstacle, and an indirect signal sent from the second sensor 416 which is different from the first sensor 412 and reflected by the obstacle.

When the direct signal and the indirect signal are both received by the first sensor 412 as illustrated in FIG. 4, the obstacle is positioned in an area where the signal sending region of the first sensor 412 and the signal sending region of the second sensor 416 overlap. In such a case, it is necessary to determine whether the obstacle is positioned more closely to the front region of the first sensor 412 or the front region of the second sensor 414.

The propagation distance of the direct signal and the propagation signal of the indirect signal may be references for such a determination, and the propagation distance calculation unit 320 calculates specific values thereof.

FIG. 4 illustrates only an example in which the first sensor 412 and the second sensor 414 are adjacent to each other. However, the sensor that sends the indirect signal received by the first sensor 412 may not be adjacent to the first sensor 412. For example, when the reflected surfaces of the obstacle reflecting the signals are irregular or formed in a predetermined angle, the signal sent from the sensor 416 which is not adjacent to the first sensor 412 may be reflected from the obstacle and arrive at the first sensor 412. However, it is not necessary to exchange indirect signals between the first sensor 412 and the sensor 416 which is not adjacent to the first sensor 412 due to a positional difference therebetween, and when considering such a signal, it may rather cause a confusion in determining the obstacle position.

Figure 5:
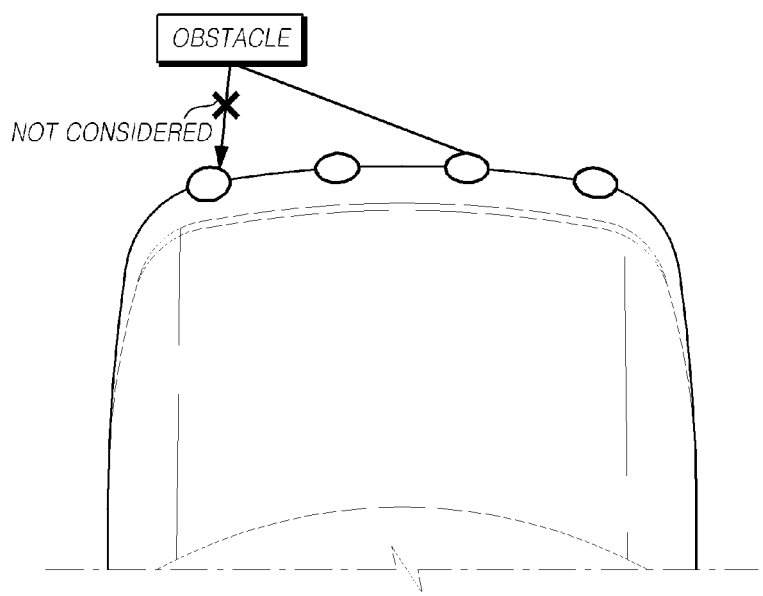
FIG. 5 illustrates an example in which a sensor ignores an indirect signal when the sensor receives the indirect signal sent from a sensor which is not adjacent therefrom.

FIG. 5 illustrates an example in which a sensor ignores an indirect signal when the sensor receives the indirect signal sent from a sensor which is not adjacent therefrom.

Referring to FIG. 5, the second sensor sending an indirect signal to the first sensor may be set as a sensor that sends a signal at a position adjacent to the first sensor. In other words, when the first sensor receives a signal, a signal sent from a sensor which is not adjacent to the first sensor and reflected may not be considered. Through this, each sensor may disregard a signal reflected from an obstacle at a position regardless of its own signal sending region while receiving only a signal from a sensor adjacent thereto.

For this purpose, specifically, the signal reception function of each sensor may be temporally stopped at a timing where a sensor which is not adjacent thereto sends a signal. In another method, each sensor may be encoded to generate a signal having a frequency which is different from that of any other sensor and to read only the frequency of a signal sent from a sensor adjacent thereto.

In order to calculate an propagation distance of a direct signal and an propagation distance of an indirect signal, the propagation distance calculation unit 320 should be capable of discriminating which one is a direct signal or an indirect signal among the received signals.

For this purpose, as illustrated in FIG. 3, the signal sending timing of each of the at least two sensors 310 may set to be different from those of other sensors so that the direct signal and the indirect signal can be discriminated. This will be described in more detail below with reference to drawings.

Figure 6:
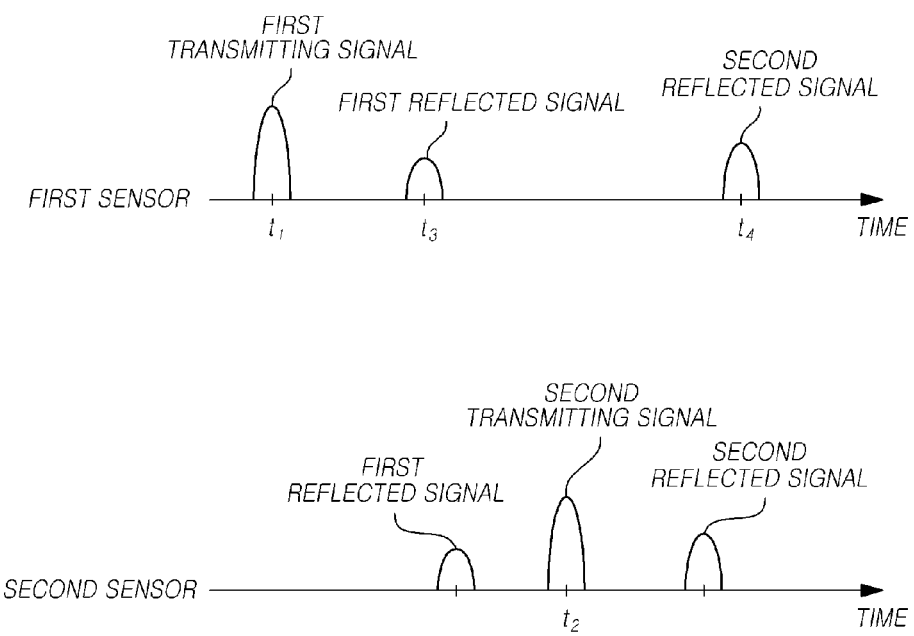
FIG. 6 is a view illustrating an example of discriminating a direct signal and an indirect signal by varying signal sending timings of the sensors.

FIG. 6 is a view illustrating an example of discriminating a direct signal and an indirect signal by varying signal sending timings of the sensors.

Referring to FIG. 6, when a signal sending timing of the first sensor ($t_1$) and a signal sending timing of second sensor ($t_2$) are set to be different from each other, a timing where a second signal sent from the second sensor and reflected (indirect signal) is received by the first signal ($t_4$) may be made to be always later than a timing where a first reflected signal sent from the first sensor and reflected (direct signal) is received by the first sensor ($t_3$). Through this, a first received signal among the signals received by the first sensor may be determined as the direct signal and a later received signal may be determined as the indirect signal. Then, the propagation distances of the direct signal and the indirect signal may be calculated. Although FIG. 6 illustrates an example in which the first signal reception timing of the ($t_3$) is faster than the second reflected signal reception timing ($t_4$), the order may be reversed.

In order to ensure reliability in discriminating the direct signal and the indirect signal through the first reflected signal reception timing ($t_3$) and the second reflected signal reception timing ($t_4$), a time difference between the signal sending timing of the first sensor ($t_1$) and the signal sending timing of the second sensor ($t_2$) may be set to be longer than a typical time interval until a signal is received after it is sent in order to prevent the order of the first reflected signal reception timing ($t_3$) and the second reflected signal reception timing ($t_4$) from being changed, or the signal sending timing of the second sensor ($t_2$) may be adjusted such that the signal of the second sensor is sent after the first reflected signal is received by the first sensor.

Discrimination of the direct signal and the indirect signal may be achieved by differently setting at least one of a waveform, a frequency and a kind of a signal wave of a signal sent by each sensor from sensor to sensor.

As an example, when the waveform of the signal sent from each sensor is set to be different from those of the signals sent from other sensors and a sensor that receives a signal analyzes the waveform of the received signal, it is possible to determine whether the received signal corresponds to the direct signal or the indirect signal.

As another example, when the frequency of the signal sent from each sensor is set to be different from those of the signals sent from other sensors and a sensor receives a signal, of which the frequency is different from the sending frequency of the sensor, the signal may be determined as the indirect signal.

As still another example, when different kinds of waves of signals, such as an ultrasonic wave and an electromagnetic wave are used, it is possible to determine which sensor each signal emanates from. Of course, the above-mentioned methods may be combined to generate signals.

In addition, when a signal sending timing is different from sensor to sensor, at least one of a waveform, a frequency, and a kind of signal wave of the signal may be set differently between sensors of which the signal sending timings are adjacent to each other, in order to further enhance the reliability in discriminating signals between the sensors of which the signal sending timings are adjacent to each other.

When discrimination as to whether a received signal is the direct signal or the indirect signal as described above is terminated, the propagation distance calculation unit 320 calculates the propagation distances of the direct signal and the indirect signal, i.e. the distances the signals have advanced until they are received after they were sent and reflected.

For this purpose, the propagation distance calculation unit 320 may measure the intensities of the direct signal and the indirect signal so as to calculate the propagation distance of the direct signal and the propagation distance of the indirect signal.

More specifically, in a state where the intensity of each signal when it is sent is known in advance, it is possible to calculate the propagation distance by comparing the intensity of each signal with the intensity when it is reflected and received.

The propagation distance calculation unit 320 may measure a time interval until the direct signal and the indirect signal are received after being sent so as to calculate the propagation distance of the direct signal and the propagation distance of the indirect signal.

More specifically, in a state where the propagation speed of a signal sent from each sensor is known, the propagation distance of a received signal may be determined by measuring a time interval until the signal is received after being sent. With this method, since it is not necessary to consider a reflection coefficient of a signal on a reflecting surface when the signal is reflected from the obstacle unlike a case in which the propagation distance is measured based on an intensity of a received signal, the accuracy may be further enhanced.

After the propagation distances of the direct signal and the indirect signal are calculated by the propagation distance calculation unit 320, the position determining unit 330 may determine the position of the obstacle by comparing the propagation distance of the direct signal and the propagation distance of the indirect signal based on the calculated propagation distances.

In such a case, there may be various cases, one of which is that the first sensor as one of the at least two sensors does not receive any other indirect signal other than the direct signal sent from first sensor.

Figure 7:
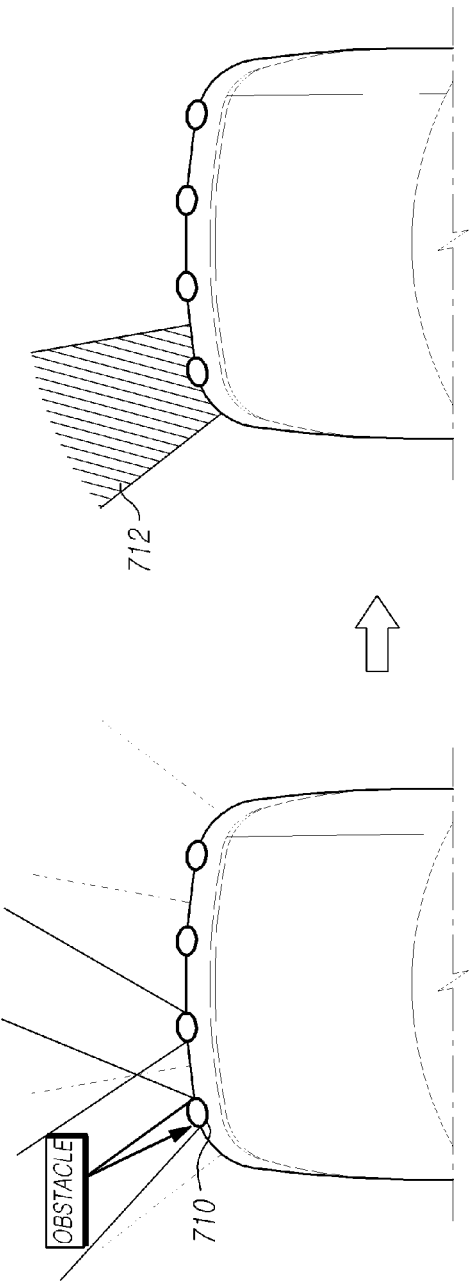
FIG. 7 is a view illustrating a result of determining an obstacle position by a position determining unit when only a direct signal is received by the first sensor.

FIG. 7 is a view illustrating a result of determining an obstacle position by a position determining unit 330 when only a direct signal is received by the first sensor 710.

Referring to FIG. 7, the position determining unit 330 may divide a region where the at least two sensors 310 send signals into two or more areas, and when a first sensor 710 does not receive an indirect signal, the position determining unit 330 may determine that an obstacle is positioned in an area 712 including the front side of the first sensor 710 among the two or more areas.

More specifically, when an optional first sensor 710 receives only a direct signal, it means that the obstacle does not exist in an area to which other sensors send a signal. Thus, it is assured that the obstacle is positioned most closely to the front side of the first sensor 710. Accordingly, the position determining unit 330 may determine that the obstacle is positioned within the area 712 including the front side of the first sensor 710.

Another case is that both the direct signal and the indirect signal are received.

Figure 8:
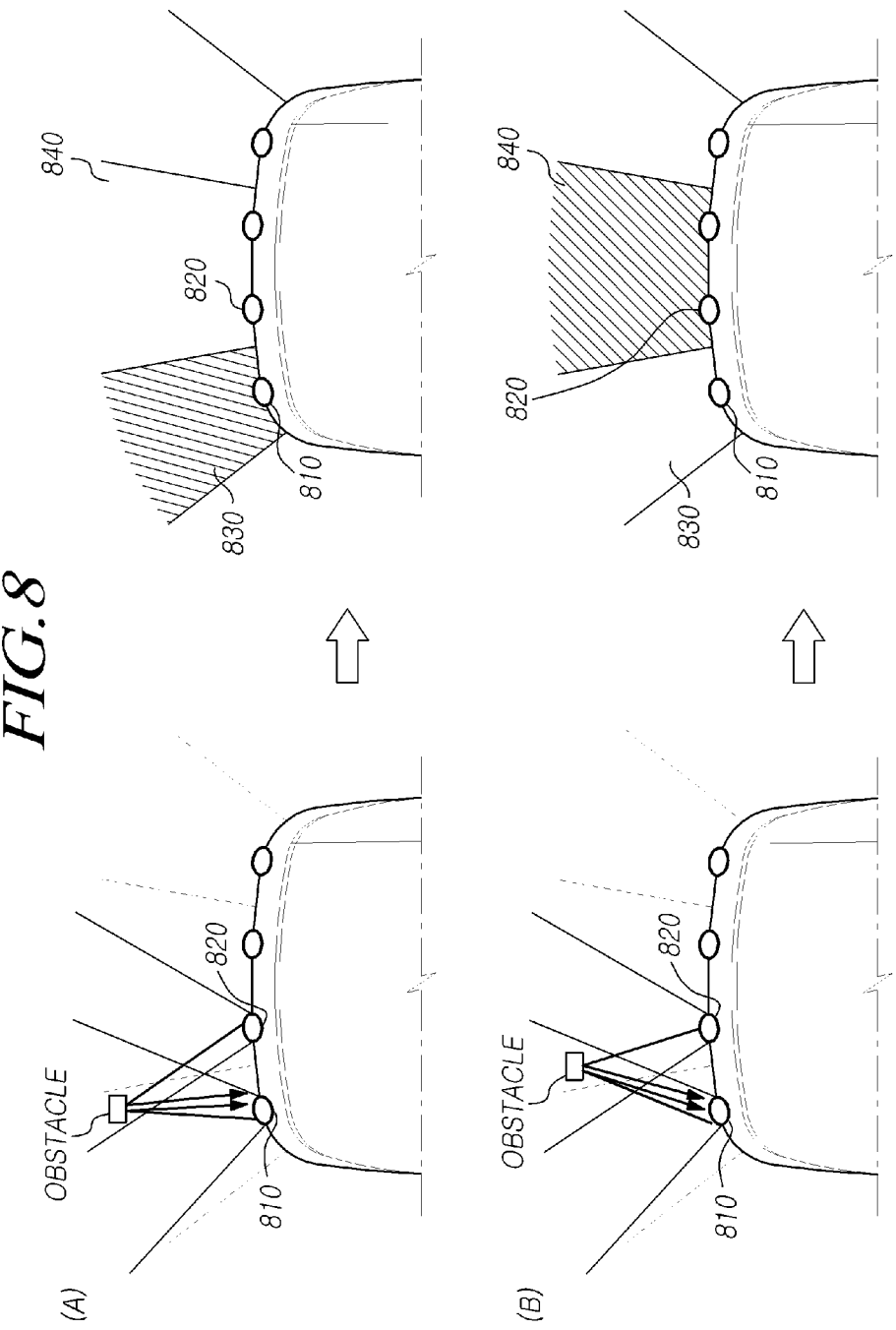
FIGS. 8a and 8b are views illustrating a result of determining an obstacle position by the position determining unit when a direct signal and an indirect signal are both received by the first sensor.

FIGS. 8*a* and 8*b* are views illustrating a result of determining an obstacle position by the position determining unit 330 when a direct signal and an indirect signal are both received by the first sensor 810.

First, FIG. 8*a* illustrates a case in which a value obtained by subtracting the propagation distance of the indirect signal from the propagation distance of the direct signal is smaller than a pre-set reference value.

The above-mentioned reference value may refer to a difference between a direct signal and an indirect signal when an obstacle is positioned on a boundary line between an area 830 including the front side of a first sensor 810 and an area 840 including a front side of a second sensor 820. Accordingly, when the reference value is set in this manner, a determining reference as to how to determine which area the obstacle is positioned in between the area 830 including the front side of the first sensor 810 and the area 840 including the front side of the second sensor 820 may be provided.

Accordingly, as illustrated in FIG. 8*a*, when the value obtained by subtracting the propagation distance of the indirect signal from the propagation distance of the direct signal is smaller than the reference value, the position determining unit 330 may determine that the obstacle is positioned in the area 830 including the front side of the first sensor 810. This is because when the propagation distance of the direct signal is shorter and when the propagation distance of the indirect signal is longer, it means the first sensor 810 is positioned more closely to the obstacle.

FIG. 8*b* illustrates a case where the value obtained by subtracting the propagation distance of the indirect signal from the propagation distance of the direct signal is larger than the pre-set reference value.

In such a case, when the propagation distance of the indirect signal is shorter and the propagation distance of the direct signal is longer, it means that the obstacle is positioned more closely to the second sensor 820. Thus, the position determining unit 330 may determine that the obstacle is positioned in the area 840 including the front side of the second sensor 820.

In the foregoing, descriptions have been made on an obstacle position determination apparatus 300 according to an exemplary embodiment of the present invention which may more correctly provide information for a position of an obstacle by comparing the propagation distance of a direct signal and the propagation distance of an indirect signal.

Hereinbelow, descriptions will be made on a parking assist system according to another exemplary embodiment of the present invention that performs a parking assist function using the above-described principles.

Figure 9:
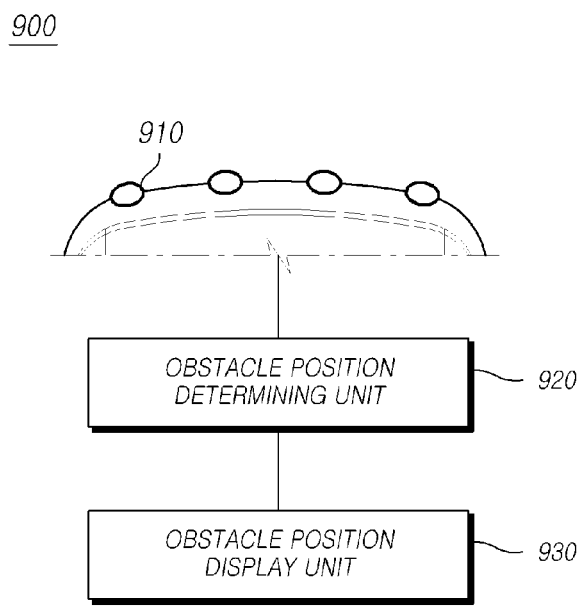
FIG. 9 is a block diagram illustrating a parking assist system according to another exemplary embodiment of the present invention.

FIG. 9 is a block diagram illustrating a parking assist system 900 according to another exemplary embodiment of the present invention.

Referring to FIG. 9, according to another exemplary embodiment of the present invention, a parking assist system 900 may include: at least two sensors 910 configured to send signals at different positions and to receive reflected signals when the signals are reflected from an obstacle; an obstacle position determining unit 920 configured to determine a position of the obstacle by comparing an propagation distance of a direct signal which is sent from a first sensor which is one of the at least two sensors 910 and received by the first sensor and an propagation signal of an indirect signal which is sent from a second sensor which is different from the first sensor among the at least two sensors 910 and received by the first sensor; and an obstacle position display unit 930 configured to divide a region where the at least two sensors 910 send signals into at least two areas and to display an alarm indicating that the obstacle exists in an area including the obstacle position determined by the obstacle position determining unit 920 among the at least two areas.

The at least two sensors 910 illustrated in FIG. 9 may perform all the functions of the at least two sensors 310 illustrated in FIG. 3.

Accordingly, the at least two sensors 910 illustrated in FIG. 9 may send signals at different positions only in a limited solid angle range with an intensity which is equal to or higher than a predetermined level.

In addition, in order to prevent reception of an unnecessary signal, in some cases, the first sensor may be set such that the first sensor is capable of receiving only a signal sent from an signal adjacent to the first sensor as an indirect signal.

The obstacle position determining unit 920 may perform all the functions performed by the propagation distance calculation unit 320 and the position determining unit 330 illustrated in FIG. 3.

At this time, in order to ensure that the obstacle position determining unit 920 may discriminate a direct signal and an indirect signal, at least one of a signal sending timing, a signal waveform, a signal frequency, and a kind of signal wave may be differently set from sensor to sensor.

When the obstacle position determining unit 920 compares the propagation distance of the direct signal and the propagation distance of the indirect signal, in some cases, the intensities of the direct signal and the indirect signal may be measured when they are received or the time intervals until the signals are received after being sent may be measured in order to calculate each of the values of the propagation distances.

In addition, in determining the position of the obstacle, the obstacle position determining unit 920 may determine which area the obstacle is positioned in among the two or more areas divided by the obstacle position display unit 930 so at to display the position of the obstacle.

As described above in the descriptions of the position determining unit 330 illustrated in FIG. 3, when the indirect signal is not received, the obstacle position determining unit 920 may determine that the obstacle is positioned in the area including the front side of the first sensor that sent the direct signal.

In addition, the obstacle position determining unit 920 may set a value obtained by subtracting the propagation distance of the indirect signal from the propagation distance of the direct signal on the boundary between the area including the front side of the first sensor and the area including the front side of the second sensor among the above-described two or more areas, as a reference value.

When the value obtained by subtracting the propagation signal of the indirect signal from the propagation distance of the direct signal is smaller than the above-described reference value, the obstacle position determining unit 920 determines that the obstacle is positioned in the area including the front side of the first sensor, and when the value obtained by subtracting the propagation distance of the indirect signal from the propagation distance of the direct signal is larger than the above-described reference value, the obstacle position determining unit 920 may determine that the obstacle is positioned in the area including the front side of the second sensor.

When the determination on the area where the obstacle is positioned is performed by the obstacle position determining unit 920, the obstacle position display unit 930 displays an alarm indicating that the obstacle exists in the area including the position of the obstacle determined by the obstacle position determining unit 920 so that the driver can avoid the obstacle.

In the method of displaying an alarm by the obstacle position display unit 930, various exemplary embodiments may exist.

As an example, as described above, a display screen of a vehicle may be controlled by the obstacle position display unit 930 such that the driver can confirm, through the display screen, the area including the position of the obstacle when the signal sending region of the at least two sensors 910 is divided into two or more areas. In such a case, the display method may indicate the area including the obstacle position using a specific color or cause light to be flickered in such an area so that the driver can recognize that the obstacle exists in the displayed area. Of course, not only the information on the screen but also an alarm sound may be output such that the driver may rapidly recognize the obstacle due to the sound.

In displaying the alarm indicating that the obstacle exists in the area including the position of the obstacle, the obstacle position display unit 930 may vary an alarm display method depending on the lengths of the propagation distance of the direct signal and the propagation distance of the indirect signal.

As an example, an alarm display method may be divided such that as the propagation distance of the direct signal and the propagation distance of the indirect signal are shorter, an alarm of a higher level is displayed such that the driver can recognize that a collision hazard is higher.

In this case, there may be various display methods to be divided depending on levels. For example, when the area including the position of the obstacle is displayed using a color different from that of a surrounding area as described above, the area may be displayed using different colors depending on a level such that the driver can intuitively recognize the proximity of the obstacle. Alternatively, in a case where light is flickered in the area where the obstacle is positioned, the number of times to flicker per unit time may be increased as the alarm level is increased such that the driver can intuitively recognize the proximity of the obstacle. In addition, a higher alarm sound may be emitted as the level is increased.

In the foregoing descriptions, the examples in which the obstacle position display unit 930 displays only the area where the obstacle is positioned have been described but exemplary embodiments are not limited thereto.

FIGS. 10*a* and 10*b* are views illustrating an example in which an obstacle position display unit 930 of the parking assist system 900 of the exemplary embodiment of the present invention displays an alarm when an obstacle exists in an area where the signal sending region of the first sensor and the signal sending region of the second sensor overlap.

Figure 10:
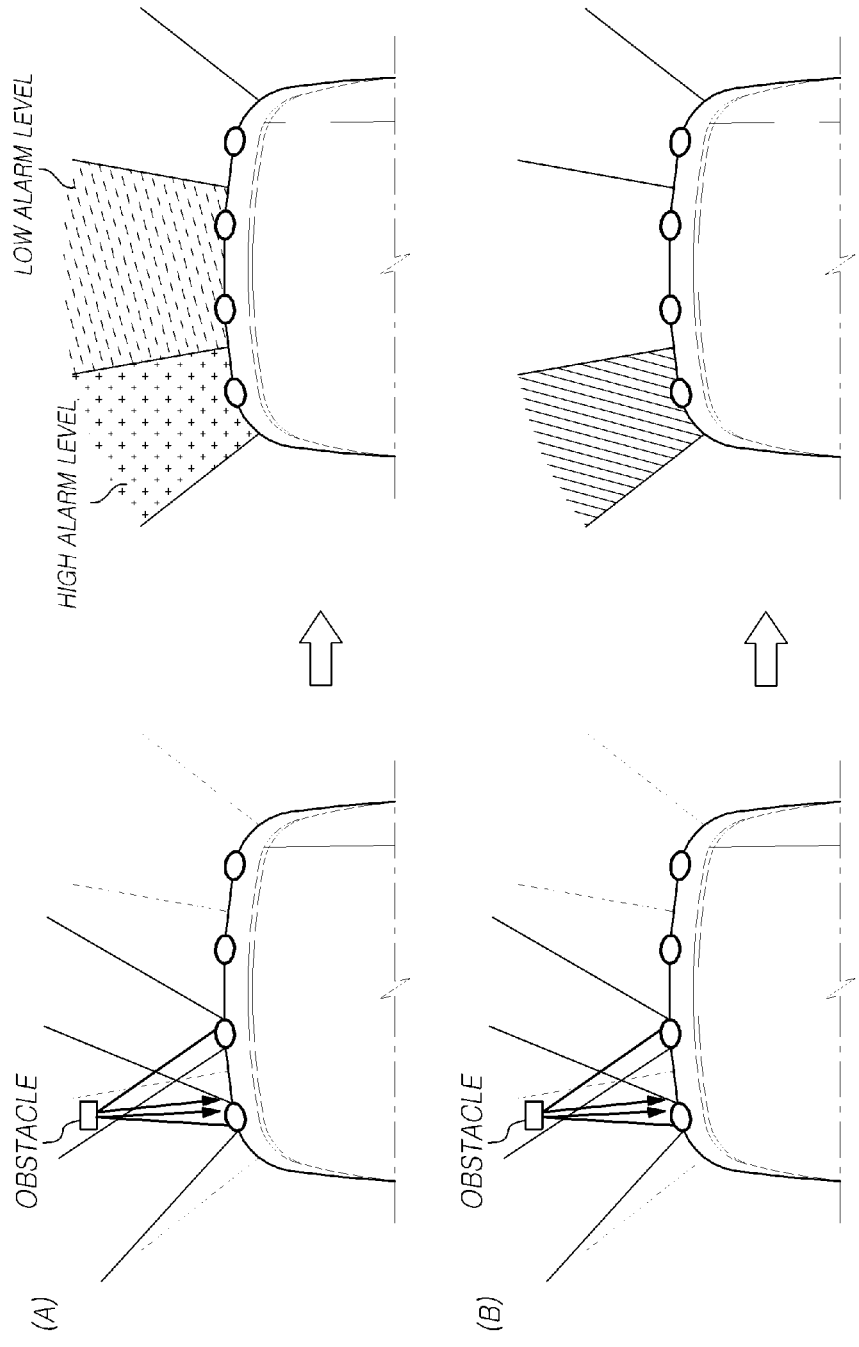
FIGS. 10a and 10b are views illustrating an example in which an obstacle position display unit of the parking assist system of the exemplary embodiment of the present invention displays an alarm when an obstacle exists in an area where the signal sending region of the first sensor and the signal sending region of the second sensor overlap.

Referring to FIGS. 10a and 10b, in displaying an alarm indicating that an object exists in an area including the position of the obstacle determined by the obstacle position determining unit 920, the obstacle position display unit 930 may also display an alarm in a different alarm display method not only in the area including the position of the obstacle but also in the area adjacent thereto among the two or more areas illustrated in FIG. 10, depending on the sizes of the propagation distance of the direct signal and the propagation distance of the indirect signal.

More specifically, as illustrated in FIG. 10a, when an object exists adjacent to a boundary between an area including a front side of a first sensor and an area including a front side of a second sensor, the difference between the propagation distance of the direct signal and the propagation distance of the indirect signal has a value close to the reference value. When the difference between the propagation distances of the direct signal and the indirect signal is close to the reference value like this, alarms may be displayed on both of the area including the front side of the first sensor and the area including the front side of the second sensor as illustrated in the right view of FIG. 10a, in which the area including the position of the actual obstacle may be displayed by an alarm of a higher level. On the contrary, as illustrated in FIG. 10b, when the difference between the propagation distances of the direct signal and the indirect signal is greatly different from the reference value because the obstacle is spaced away from the boundary between the area including the front side of the first sensor and the area including the front side of the second sensor, no alarm may be displayed or an alarm may be displayed at a level significantly lower than the area including the position of the obstacle in the area which does not include the position of the obstacle. When alarms are displayed in the area including the position of the obstacle and the area adjacent thereto with reference to the difference between the propagation distance of the direct signal and the propagation distance of the indirect signal in different methods as described above, the driver can intuitionally recognize more correct information for the position of the obstacle.

In the forgoing, an obstacle position determination apparatus 300 and a parking assist system 900 according to the exemplary embodiments of the present invention have been described. Hereinafter, descriptions will be made on a method of determining a position of an obstacle by the obstacle position determination apparatus 300 and a parking assist method by the parking assist system, according to exemplary embodiments of the present invention. Both of the method of determining a position of an obstacle to be described later by the obstacle position determination apparatus 300 and a parking assist method by the parking assist system, according to the exemplary embodiments of the present invention may be performed using the obstacle position determination apparatus 300 and parking assist system 900 according to the exemplary embodiments according to the present invention which are illustrated in FIGS. 3 and 9.

Figure 11:
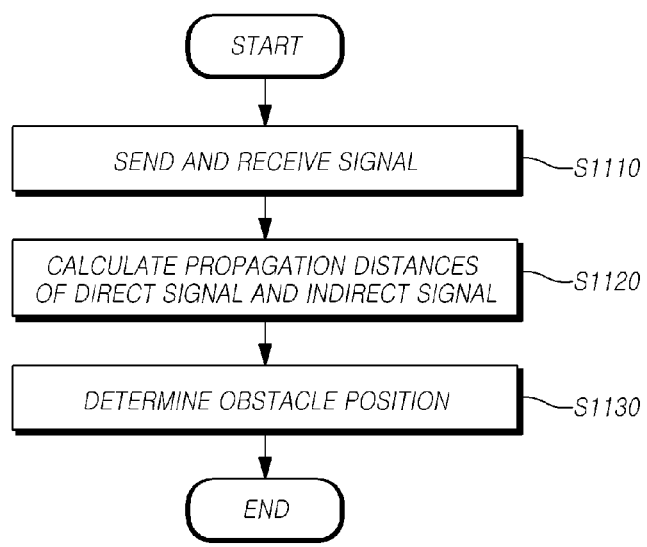
FIG. 11 is a flowchart illustrating a method of determining an obstacle position by an apparatus of determining obstacle position according to still another exemplary embodiment of the present invention.

FIG. 11 is a flowchart illustrating a method of determining an obstacle position by an apparatus of determining obstacle position 300 according to still another exemplary embodiment of the present invention.

Referring to FIG. 11, according to still another exemplary embodiment according to the present invention, a method of determining a position of an obstacle by the obstacle position determination apparatus 300 may include: sending signals at different positions by at least two sensors 310 and when the signals are reflected from an obstacle, receiving reflected signals by the at least two sensors (S1110); calculating an propagation distance of a direct signal which is sent from a first sensor which is one of the at least two sensors 310 and received by the first sensor, and an propagation distance of an indirect signal which is sent from a second sensor which is different from the first sensor among the at least two sensors 310 and received by the first sensor (S1120); and based on results calculated in the calculating of the propagation distances (S1120), determining the position of the obstacle by comparing the propagation distance of the direct signal and the propagation distance of the indirect signal (S1130).

As described above with reference to FIG. 3, according to the method of determining a position of an obstacle by the obstacle position determination apparatus 300 according to still another exemplary embodiment of the present invention, a determination on the area where the obstacle is positioned may be performed more correctly by comparing the propagation distance of the direct signal and the propagation distance of the indirect signal.

Figure 12:
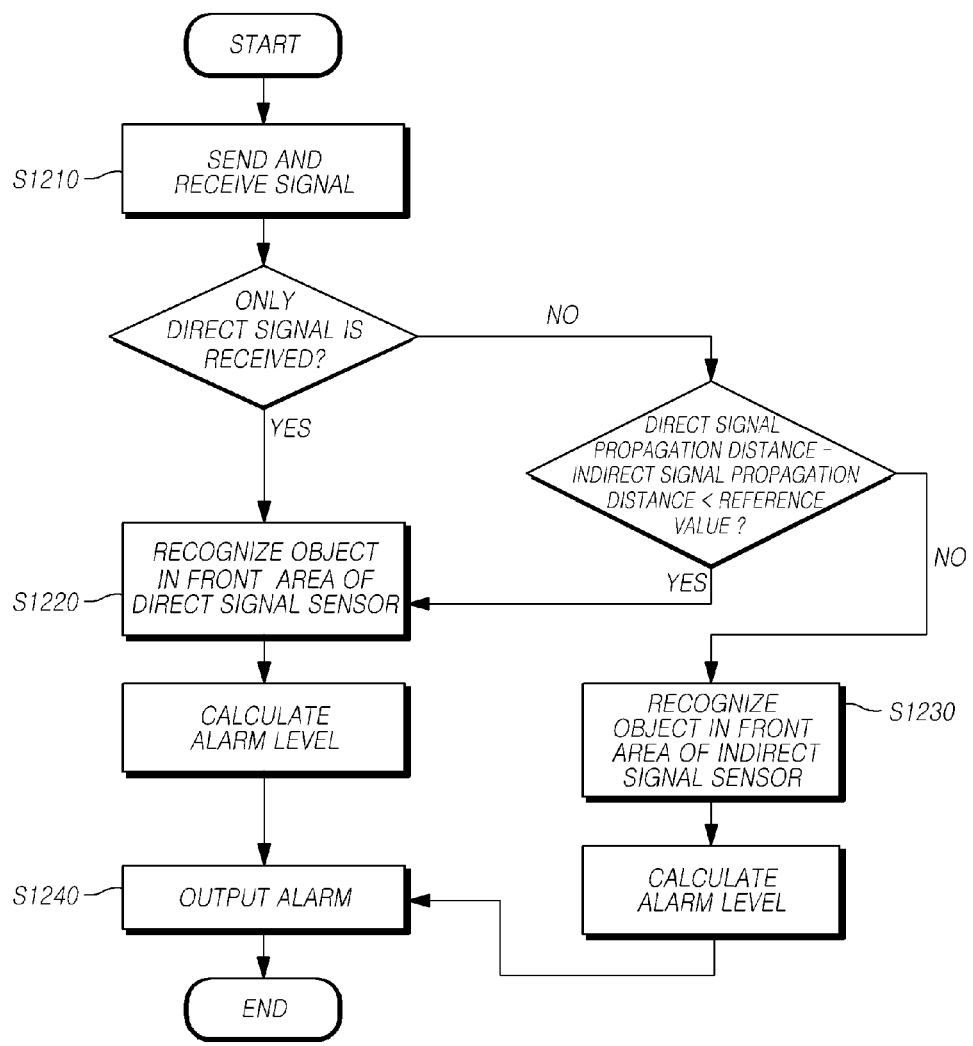
FIG. 12 is a flowchart illustrating a parking assist method by a parking assist system according to yet another exemplary embodiment of the present invention.

FIG. 12 is a flowchart illustrating a parking assist method by a parking assist system 900 according to yet another exemplary embodiment of the present invention.

The step of determining a position of an obstacle in the parking assist method by the parking assist system 900 illustrated in FIG. 12 is similar to the step of determining a position of an obstacle in the method of determining an obstacle by the obstacle position determination apparatus 300 described above with reference to FIG. 11, and will be described in more detail with reference to FIG. 12.

Referring to FIG. 12, according to yet another exemplary embodiment of the present invention, a parking assist method by the parking assist system 900 may include: sending signals at different positions by at least two sensors 910 and when the signals are reflected by an obstacle, receiving reflected signals by the at least two sensors 910 (S1210); determining a position of the obstacle by comparing an propagation distance of a direct signal which is sent by a first sensor which is one of the at least two sensors 910 and received by the first sensor, and an propagation distance of an indirect signal which is sent by a second sensor which is different from the first sensor among the at least two sensors 910 (S1220, S1230); and dividing a region where the at least two sensors 910 send the signals into two or more areas to determine the position of the obstacle, and displaying an alarm indicating that the obstacle exists in an area including the position of the obstacle which is determined in the determining of the position of the obstacle among the two or more areas (S1220, S1230) (S1240).

As described above with reference to FIG. 7, in determining the position of the obstacle (S1220, S1230), when only the direct signal is received as a reception signal, it may be determined that the obstacle exists adjacent to the front area of the sensor that sent the direct signal (S1220)

In addition, as described above with reference to FIG. 8, the value obtained by subtracting the propagation distance of the indirect signal from the propagation distance of the direct signal and the pre-set reference value are compared with each other. When the value obtained by subtracting the propagation distance of the indirect signal from the propagation distance of the direct signal is smaller than the pre-set reference value, it may be determined that the obstacle exists adjacent to the front area of the sensor that sent the direct signal (S1220) and in the reverse case, it may be determined that the obstacle exists adjacent to the front area of the sensor that sent indirect signal (S1230).

At this time, the reference value may be set as a difference value between the propagation distances of the direct signal and the indirect signal when the obstacle is positioned on the boundary between the area including the front side of the first sensor that sends the direct signal and the area including the front side of the second sensor that sends the indirect signal as described above with reference to FIG. 8.

As described above, according to the present invention, because more correct information for a position of an obstacle with reference to a difference between the propagation distances of the direct signal and the indirect signal can be provided, it is possible to effectively avoid a collision against the obstacle when parking a vehicle or driving a transportation vessel or the like.

Even if it was described above that all of the components of an embodiment of the present invention are coupled as a single unit or coupled to be operated as a single unit, the present invention is not necessarily limited to such an embodiment. At least two elements of all structural elements may be selectively joined and operate without departing from the scope of the present invention. Although the embodiments of the present invention have been described for illustrative purposes, those skilled in the art will appreciate that various modifications, additions and substitutions are possible, without departing from the scope and spirit of the invention. The scope of the present invention shall be construed on the basis of the accompanying claims in such a manner that all of the technical ideas included within the scope equivalent to the claims belong to the present invention.

What is claimed is:

1. An apparatus of determining a position of an obstacle, the apparatus comprising:
    at least two sensors configured to transmit signals at different positions and receive reflected signals when the transmitting signals are reflected from an obstacle;
    an propagation distance calculation unit configured to calculate an propagation distance of a direct signal which is sent from a first sensor which is one of the at least two sensors and received by the first sensor, and an propagation distance of an indirect signal which is sent from a second sensor which is different from the first sensor among the two more sensors and received by the first sensor; and
    a position determining unit configured to determine a position of the obstacle by comparing the propagation distance of the direct signal and the propagation distance of the indirect signal, based on a result calculated by the propagation distance calculation unit.

2. The apparatus of claim 1, wherein the at least two sensors respectively send the signals in a range of a limited solid angle with an intensity equal to or higher than a predetermined level.

3. The apparatus of claim 1, wherein at least one of a signal sending timing, a signal waveform, a signal frequency, and a kind of signal wave of a signal sent by each of the at least two sensors is set differently from sensor to sensor so that the direct signal and the indirect signal can be discriminated from each other.

4. The apparatus of claim 3, wherein at least one of the signal waveform, the signal frequency, and the kind of signal wave of the signal sent by each of the at least two sensors is different between two adjacent sensors of which the signal sensing timings are adjacent to each other among the at least two sensors.

5. The apparatus of claim 1, wherein the propagation distance calculation unit measures intensities of the direct signal and the indirect signal and/or time intervals until the direct signal and the indirect signal are received after being sent to calculate the propagation distance of the direct signal and the propagation distance of the indirect signal.

6. The apparatus of claim 1, wherein the position determining unit divides the region where the at least two sensors send the signals into two or more areas, and when no indirect signal is received by the first sensor, the position determining unit determines that the obstacle is positioned in an area including a front side of the first sensor among the two or more areas.

7. The apparatus of claim 1, wherein the position determining unit divides the region where the at least two sensors send the signals into two or more areas,
    wherein the position determining unit sets a value obtained by subtracting the propagation distance of the indirect signal from the propagation distance of the direct signal at a boundary between an area including a front side of the first sensor and an area including a front side of the second sensor among the two or more areas as a reference value, and
    wherein, when the value obtained by subtracting the propagation distance of the indirect signal from the propagation distance of the direct signal is smaller than the reference value, the position determining unit determines that the obstacle is positioned in the area including the front side of the first sensor, and when the value obtained by subtracting the propagation distance of the indirect signal from the propagation distance of the direct signal is larger than the reference value, the position determining unit determines that the obstacle is positioned in the area including the front side of the second sensor.

8. A parking assist system comprising:
    at least two sensors configured to transmit signals at different positions and to receive reflected signals when the transmitting signals are reflected from an obstacle;
    an obstacle position determining unit configured to determine a position of the obstacle by comparing an propagation distance of a direct signal which is sent from a first sensor which is one of the at least two sensors and received by the first sensor and an propagation signal of an indirect signal which is sent from a second sensor which is different from the first sensor among the at least two sensors and received by the first sensor; and
    an obstacle position display unit configured to divide a region where the at least two sensors send signals into at least two areas and to display an alarm indicating that the obstacle exists in an area including the obstacle position determined by the obstacle position determining unit among the at least two areas.

9. The parking assist system of claim 8, wherein at least one of a signal sending timing, a signal waveform, a signal frequency, and a kind of signal wave of a signal sent by each of the at least two sensors is set differently from sensor to sensor so that the direct signal and the indirect signal can be discriminated from each other.

10. The parking assist system of claim 8, wherein the obstacle position determining unit compares intensities of the direct signal and the indirect signal or measures time intervals until the direct signals and the indirect signals are received after being sent so as to compare the propagation distance of the direct signal and the propagation signal of the indirect signal.

11. The parking assist system of claim 8, wherein, when only the direct signal is received by the first sensor among the direct signal and the indirect signal, the obstacle position determining unit determines that the obstacle is positioned in an area including a front side of the first sensor among the two or more areas.

12. The parking assist system of claim 8, wherein the obstacle position determining unit sets a value obtained by subtracting the propagation distance of the indirect signal from the propagation distance of the direct signal at a boundary between an area including a front side of the first sensor and an area including a front side of the second sensor among the two or more areas as a reference value, and wherein, when the value obtained by subtracting the propagation distance of the indirect signal from the propagation distance of the direct signal is smaller than the reference value, the obstacle position determining unit determines that the obstacle is positioned in the area including the front side of the first sensor, and when the value obtained by subtracting the propagation distance of the indirect signal from the propagation distance of the direct signal is larger than the reference value, the obstacle position determining unit determines that the obstacle is positioned in the area including the front side of the second sensor.

13. The parking assist system of claim 8, wherein the obstacle position display unit displays the alarm in different methods depending on the lengths of the propagation distance of the direct signal and the propagation distance of the indirect signal when displaying the alarm indicating that the obstacle exists in the area including the position of the obstacle.

14. The parking assist system of claim 8, wherein, when displaying the alarm indicating that the obstacle exists in the area including the position of the obstacle determined by the obstacle position determining unit, the obstacle position display unit displays an alarm for each of the area including the position of the obstacle and the area adjacent to the area including the position of the obstacle among the two or more areas in different methods depending on sizes of the propagation distance of the direct signal and the propagation distance of the indirect signal.

15. A method of determining a position of an obstacle, the method comprising:

sending signals at different positions by at least two sensors and when the signals are reflected from an obstacle, receiving reflected signals by the at least two sensors;

calculating an propagation distance of a direct signal which is sent from a first sensor which is one of the at least two sensors and received by the first sensor, and an propagation distance of an indirect signal which is sent from a second sensor which is different from the first sensor among the at least two sensors and received by the first sensor; and determining the position of the obstacle by comparing the propagation distance of the direct signal and the propagation distance of the indirect signal, based on a result calculated in the calculating of the propagation distances.

* * * * *